Nov. 14, 1950
D. H. McGOGY
2,530,337
FLUID PRESSURE UNIT
Filed April 12, 1946
2 Sheets-Sheet 1
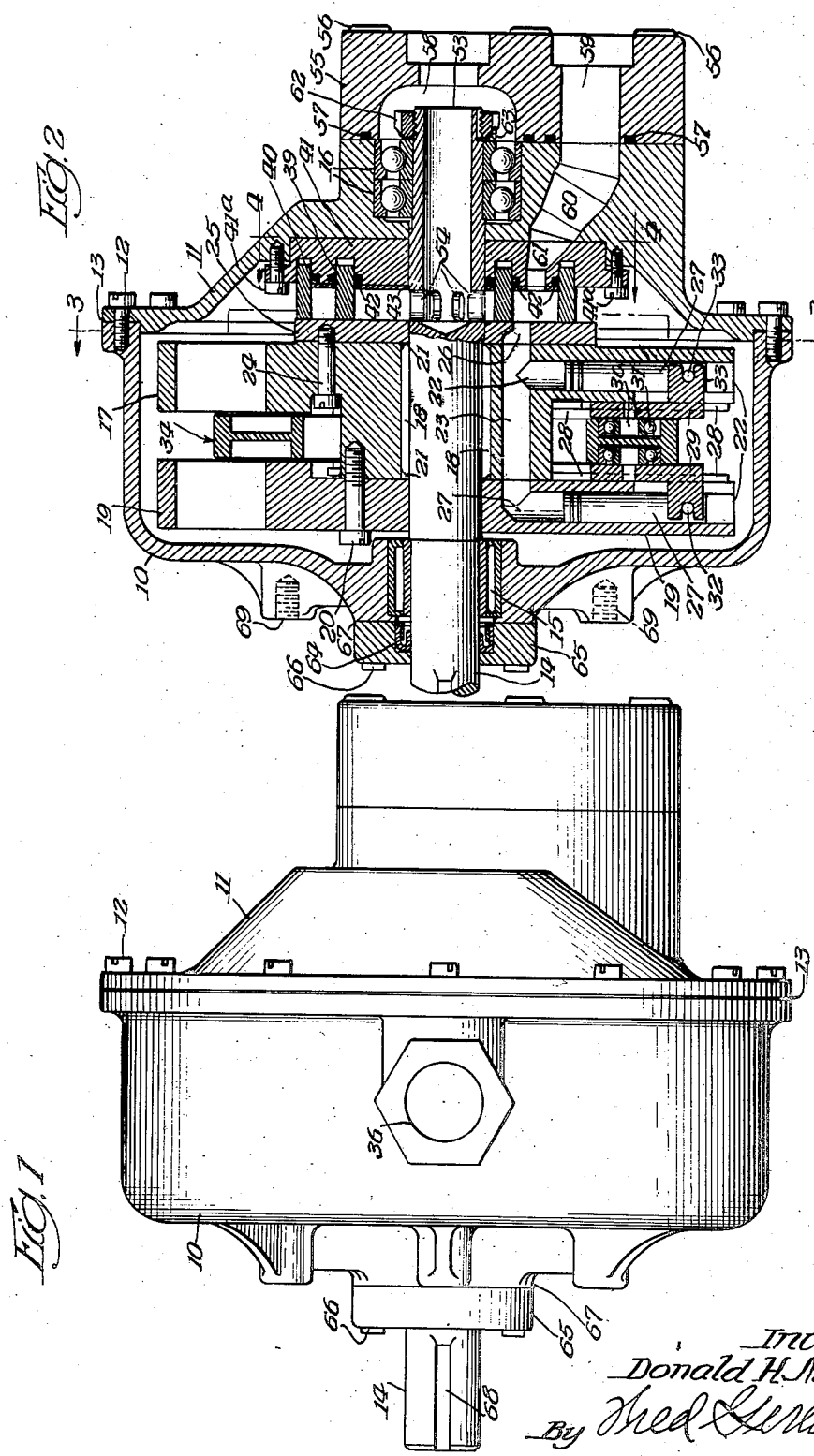
Inventor
Donald H. McGogy
By Fred Gerlach
Attys.

Nov. 14, 1950 D. H. McGOGY 2,530,337
FLUID PRESSURE UNIT
Filed April 12, 1946 2 Sheets-Sheet 2
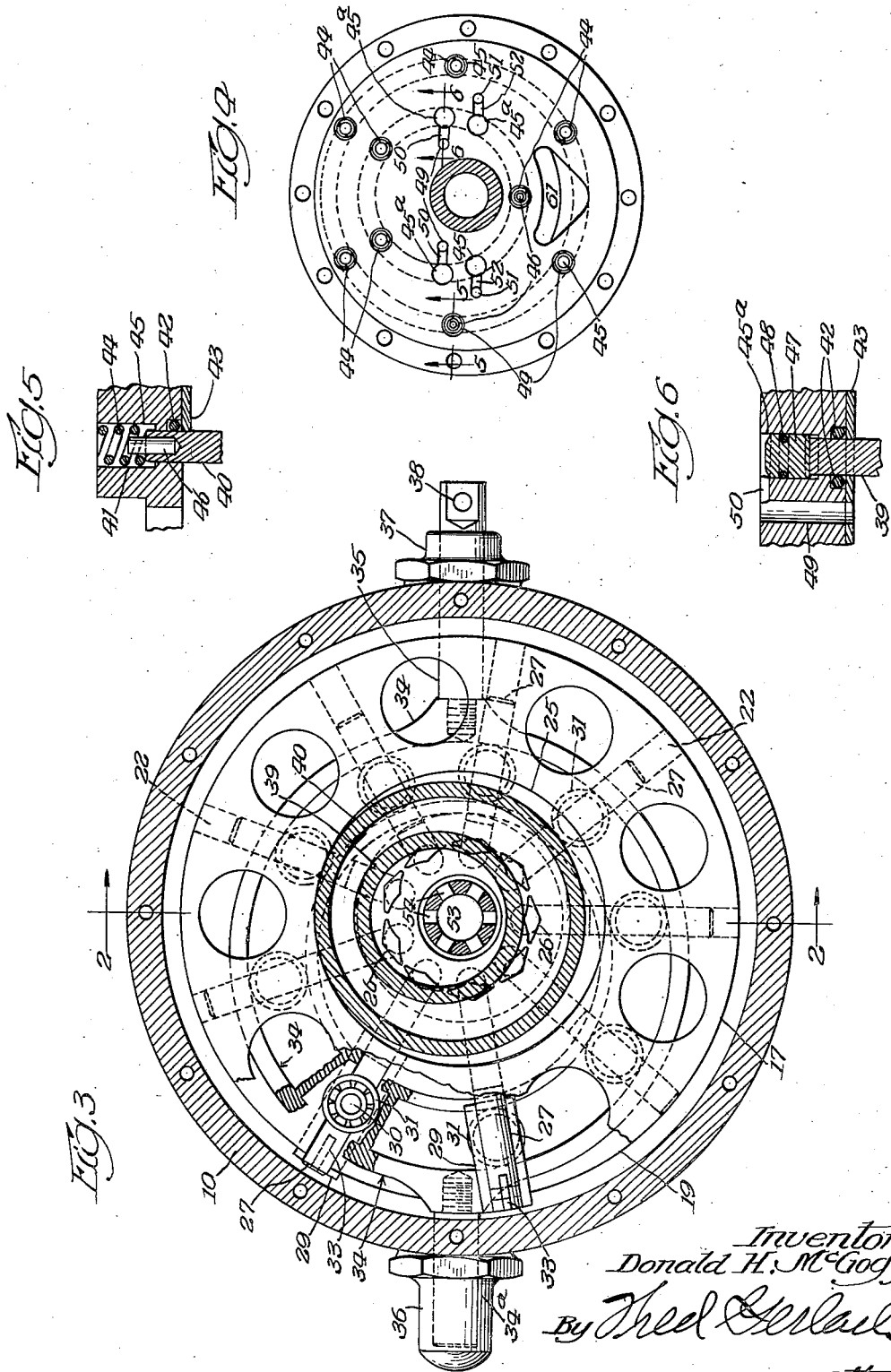
Inventor
Donald H. McGogy
By Fred Gerlach
atty.

Patented Nov. 14, 1950

2,530,337

UNITED STATES PATENT OFFICE 2,530,337

FLUID PRESSURE UNIT

Donald H. McGogy, Vancouver, Wash., assignor to Edward S. Marnon, Oregon City, Oreg.

Application April 12, 1946, Serial No. 661,463

8 Claims. (Cl. 103—161)

1

This invention relates, in general, to fluid pressure units, which embody a rotor housed within a casing, and which unit is adapted to operate as a fluid motor or as a pump.

One of the objects of the invention is to provide in a unit of this character, improved valve mechanism for controlling the flow of the fluid.

Another object is to provide an improved construction of rotor or cylinder block, whereby the diameter thereof may be materially reduced from that required in prior similar units of a comparable size, and which will reduce to a minimum, friction and wear on the pistons and cylinders.

A further object is to provide improved means whereby the pistons will operate with long strokes.

A still further object is to provide a structure of this character, in which the volume of fluid handled thereby will be increased from that handled heretofore by units of a size comparable with the present structure, when used as a pump, and which will increase the torque when the same is employed as a motor, without material increase in size and weight of the unit.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawings, in which Fig. 1 is a side elevation of a unit of this character, constructed in accordance with the principles of this invention;

Fig. 2 is a sectional view taken on line 2—2, Fig. 3, the means for holding the inner valve ring seated, being omitted;

Fig. 3 is a sectional view taken on line 3—3, Fig. 2;

Fig. 4 is a sectional view taken on line 4—4, Fig. 2;

Fig. 5 is an enlarged detail sectional view taken on line 5—5, Fig. 4, showing one of the means for holding the valve rings seated.

Fig. 6 is an enlarged detail sectional view taken on line 6—6, Fig. 4, showing one of the means for overcoming the lifting force upon the valve ring.

This improved unit consists, essentially, of a housing or casing 10, having a cover plate 11, secured in position preferably by fastening screws 12, and sealed against leakage by a suitable gasket or packing 13. Journaled in the housing and cover plate is a shaft 14, which is mounted in a roller bearing 15, and a tandem ball thrust bearing 16. A cylinder block 17 is mounted upon the shaft 14, and is secured thereto for rotation there-

2 with, preferably, by means of keys 18, and is pressed fit to prevent leakage of pressure fluid along the shaft.

An additional cylinder block 19 is mounted adjacent the cylinder block 17 on the shaft 14, and is secured firmly to the hub of cylinder block 17 by means of fastening screws 20, and sealed against leakage by means of a suitable gasket 21. Formed within these cylinder blocks are a plurality of radial cylinders 22, which open through the periphery thereof and the cylinders are disposed or arranged in pairs which are uniformly and equally spaced around the circumference of the blocks. The pairs of cylinders are connected together by means of a communicating passage 23 adjacent the inner ends thereof, said passages 23 extending through the end surface of the cylinder block 17 to serve as inlet and outlet passages for the pairs of cylinders.

Secured to the face of the cylinder block 17, in any suitable manner, such as by means of screws 24, is a valve plate 25, the outer face of which is lapped and polished to a perfect plane. Ports 26 are provided in the valve plate, one for each pair of cylinders 22, and these ports register, or coincide with the respective passages 23 in the cylinder blocks 17 and 19, whereby each pair of cylinders will have communication with a port in the valve plate.

A piston 27 is reciprocable in each of the cylinders 22, each piston being provided with a suitable packing ring or cup leather at its inner end, to effect a seal with the cylinder walls. Radial guide slots 28 (Figure 3) are formed on the inner faces of the cylinder blocks 17 and 19, said guide slots being adjacent each cylinder and parallel to the same.

Mounted to reciprocate in these slots or raceways are cross heads 29, which carry integral pins or projections 30, that serve as axles for roller bearings 31. An extended arm at the outer end of each cross head, and integral therewith engages a pin 32 in a slot 33, the pin being carried by the outer end of the adjacent piston, whereby a non-rigid connection is effected between each piston and at its adjacent cross head.

An annular raceway or track 34 is mounted within the case or housing 10 and positioned to be in the space between the cylinder blocks 17 and 19. Raceway 34 is provided with an annular groove on each face in which the ball bearings 31 travel and said raceway is adapted to be moved edgewise so as to become eccentric with respect to the shaft 14. In order to accomplish this movement or shifting of the raceway, and at the same time support the raceway in position, guide pins 34a and 35 (Figure 3) may be rigidly fixed to the raceway on the center line, and diametrically opposite each other. A hub 36 accommodates the pin 34a, while a hub or bearing 37 serves as a bearing for the pin 35. This pin 35 may be flattened at its outer end and provided with an opening 38, therethrough to afford a means of connection for conveniently changing the position of the raceway 34 from the outside of the case or housing 10. Leakage of fluid out of the casing at the pin 35 is prevented by suitable packing means incorporated in the hub 37.

Valving of pressure fluids into and out of the cylinder 22 is accomplished by means of two annular valve rings 39 and 40, which are lapped to a perfect seat on the face of the valve plate 25. Valve ring 39 is disposed within the valve ring 40, both being eccentric to the shaft 14. The eccentricity of the ring 39 is for the purpose of accomplishing reversal of flow of pressure fluid, as more fully described hereinafter. Eccentricity of ring 40 is for the purpose of providing lubrication to the face of the ring 40, where it bears upon the valve plate 25. The valve rings are supported and held in place by means of a base plate 41, secured by means of fastening screws 41a. Suitable packing rings 42 may be held in position by means of keeper plates 43. Resilient elements, such as coiled springs 44, (Figure 5) operating in recesses 45 serve to maintain the valve rings 39, 40 in leak proof contact with valve plate 25.

Pins 46, (one to each valve ring) may be provided to maintain the valve rings 39, and 40, against rotation.

Small pistons 47, (Figure 6) fitted with seal rings 48, are mounted in four of the recesses 45a. Pressure fluid from the space within the valve ring 39, is led to a space at the back end of two of the pistons 47, by means of passages 49, and connecting passages or channels 50. Pressure fluid from the space between the valve rings 39 and 40 is conducted to the space back of two additional pistons 47, by means of passages 51, and connecting channels 52 (Figure 4). The cross sectional area of one piston 47, is designed to be equivalent to the valve ports 26, at the surface of the valve plate 25. As the valve ports pass under valve ring 39, the upward fluid pressure against the end surface of ring 39, is offset by the fluid pressure exerted in the opposite direction by piston 47, in contact with valve ring 39. This balancing force will always be in direct ratio to the pressure of the fluid being used. When operating with light pressures, no excessive and unnecessary load will be exerted on valve plate 25, by the valve ring 39.

The shaft 14, is provided with a longitudinal passage 53, opening through one end thereof, and lateral passages 54, communicating therewith, opening through the side of the shaft and have communication with the space within the valve ring 39. A flange 55, is secured to the cover plate 11, by means of recessed fastening screws 56, and gasketed at 57, to prevent leakage of pressure fluid. A passageway 58, is provided in the flange 55, and has communication with the tubular end of the shaft 14. Another passageway 59, in the flange 55, communicates with a passageway 60, in the cover plate 11 and passageway 61, in valve base 41, to conduct pressure fluid in or out of the space between the valve rings 39, and 40. Flow and exhaust pipes may be fitted into the passages 58, and 59, by brazing, welding or in any other suitable manner. Thrust on the bearing 16, due to the pressure of fluid within the valve rings 39 and 40 is restrained, preferably by means of a threaded nut 62, locked in adjusted position by means of a serrated lock washer 63.

Hydraulic fluid is maintained within the casing 10, for the purpose of lubricating all of the moving parts. Leakage of this lubricating fluid around the shaft 14, may be prevented by means of a conventional packing gland 64, carried by a cover plate 65, secured by means of recessed screws 66, and sealed to the case 10, by means of a sheet gasket, as at 67.

A key way 68, may be provided in the shaft 14, for attaching a gear wheel, or chain sprocket, and a plurality of tapped holes 69, may be provided, whereby the unit may be attached to a machine frame, or any other suitable support.

It is thought that the operation of this unit will be fully understood from the foregoing description, but, briefly stated, it is as follows:

Pressure fluid flowing through the opening 53 in the end of the shaft 14, will pass through the openings 54, into the space within the eccentric valve ring 39, and will be confined within the eccentric position with respect to the valve ports 26. The fluid will then flow into the cylinders 22, whose ports are within the eccentric valve ring 39. The cylinders on the opposite side of the valve ring 39 will then have their ports in communication with the space between the valve rings 39 and 40. The fluid can then flow from the space within the valve ring 39, through the passage 60, and out through the passage 59.

The operation of this improved unit, when the same is employed as a fluid motor, is as follows:

The annular track 34 may be fixed in extreme position by adjusting the same by means of the push rod 35, either to the right or left, to obtain maximum torque, as in Fig. 3, where it is shown to the extreme left position. Pressure fluid will then enter through the passage 58, thence by way of the passage 53 in the shaft 14, through the openings 54, to the space within the annular valve ring 39, from where it enters the cylinders through the valve ports 26, which are inside of the valve ring 39. Pressure on the pistons on one side of the motor causes rotation of the cylinder blocks 17 and 19, and shaft 14. As the pistons reach the end of their stroke outwardly, they pass dead center, and the fluid within the cylinders is exhausted through the ports 26, which will then be in communication with the space between the valve rings 39 and 40. From this space the fluid will flow into the exhaust passage 60, to the outlet 59.

When operating as a pump, power is applied to the shaft 14, and fluid is supplied under light pressure (or head) through the passage 59, and passage 60, into the cylinders through the ports 61, 26, which are in communication with the space that is between the valve rings 39 and 40, the pressure being sufficient to force the pistons out as far as the annular track 34 will permit them to go.

When the annular track is centered with respect to the shaft 14, there will be no stroke of the pistons and therefore no delivery of fluid. When, however, this track 34, is moved to the position shown in Fig. 3, the fluid would be sucked or drawn in through the passages 59, 60, 61, and delivered out through the passages 53, 58, the rate of delivery being in direct ratio to the amount of eccentricity of the annular track 34. When the annular track 34, is moved to the opposite side of the center, the flow of fluid will be reversed.

If two units of the same size were hooked up in a closed circuit as a pump-motor variable speed unit, then the motor would supply the small amount of pressure needed by the suction side of the pump to force the pistons outward on their suction stroke. At high speeds of rotation, centrifugal force will also maintain the roller bearings 30, in contact with the track 34, on the suction stroke of the pistons. By adjustment of the annular track 34, it will be manifest that the volumetric capacity of the unit may be varied at will. By the use of twin cylinders and pistons, the volume of the unit as a pump is doubled, and, as a motor, the torque is doubled, with very small increase in size and weight.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A device of the class described, comprising: a rotary shaft, a first member carried by said shaft and having a surface normal to the axis of rotation thereof and concentric therewith, a plurality of port openings in said surface arranged in a circle concentric with said axis, a second member concentric with said shaft having a surface parallel to that of said first member and spaced therefrom, said second member being non-rotatable, a first ring concentric with said shaft and slidably mounted in an annular groove in said second member and bearing along one edge against the said surface of said first member, spring means urging said first ring toward said first member, a second ring disposed internally of said first ring and eccentrically of said shaft and slidably mounted in a second annular groove in said second member and bearing along one edge against the said surface of said first member, and spring means urging said second ring toward said first member, said second ring being spaced radially from said first ring to form an annular chamber, the arrangement being such that said port openings move consecutively into and out of communication with said annular chamber and alternately into and out of communication with a chamber inside said second ring, when said shaft is rotating, said shaft having a fluid passageway extending axially thereof from one end and communicating with the last-mentioned chamber, said second member having a fluid passageway therethrough communicating with said annular chamber.

2. A device in accordance with claim 1 including a plurality of cylinders carried by and rotatable with said shaft and each connected, individually, with one of said port openings, a piston reciprocable in each of said cylinders, individually, and means whereby the reciprocating movements of said pistons is effective to rotate said shaft and vice-versa, said device being operative, alternately, as either a pump or a fluid-pressure motor.

3. A fluid-pressure device of the class described, comprising a rotary shaft, two rotors secured to said shaft and rotatable therewith, an annular track member encircling said shaft and disposed between said rotors but not rotatable therewith, each of said rotors having a row of radially extending cylinders disposed symmetrically about the axis of rotation of said shaft, each cylinder of each row being paired with a cylinder of the other row, a piston for each said cylinder, individually, said pistons being reciprocable in their respective cylinders, said track member having two parallel annular raceways, a plurality of ball-bearing units in each of said raceways, a plurality of cross-heads each connected to one of said pistons, individual, and each having a trunnion on which one of said ball-bearing units is mounted axially, said track member being adjustably movable normally to the axis of said shaft, and valve mechanism operative to admit fluid under pressure to said pairs of cylinders consecutively.

4. Valve mechanism including a rotatable member having an axis of rotation, said member having a surface non-parallel to said axis and having a plurality of ports opening into said surface and disposed in a circle concentric with said axis, a second member spaced from said rotatable member lengthwise of said axis, a ring disposed eccentrically to said axis and slidably mounted in an annular groove in said second member, said ring bearing edgewise against the said surface of said rotatable member and operative to open and close said ports successively, said ring being biased by fluid pressure toward said surface sufficiently to counteract any back pressure from said ports tending to force said ring away from said surface.

5. Valve mechanism in accordance with claim 4 including a plurality of fluid-pressure-actuated pistons operative to force said ring toward said rotatable member and in communication with a source of fluid pressure within the valve structure, said pistons being proportioned to at least offset the back pressure acting against said ring through said ports.

6. Valve mechanism according to claim 4 wherein the said surface of said rotatable member is in a plane normal to said axis of rotation.

7. In a fluid-pressure device of the class described, a rotary shaft, a plurality of cylinders carried by and disposed in spaced relation around said shaft and rotatable therewith, a reciprocable piston in each of said cylinders, individually, means whereby the combined reciprocatory movements of said pistons is effective to rotate said shaft, a valve member carried by and rotatable with said shaft and having a surface concentric with said shaft, a plurality of ports opening on said surface and communicating individually with said cylinders, said ports being spaced circumferentially and located on a circle concentric with said shaft, a non-rotatable member encircling said shaft and spaced from said surface lengthwise of said shaft, a ring encircling said shaft, eccentrically thereto, and disposed in the space between said valve member and said non-rotatable member, said non-rotatable member being provided with an annular groove encircling said shaft, eccentrically thereto, in which said ring is seated, one edge of said ring bearing against said surface, said members together with said ring and said shaft defining a valve chamber, said shaft having an axial passageway leading into said chamber, and a plurality of pistons each reciprocably mounted, individually, in cylinder bores formed in said non-rotatable member and adapted, when actuated, to press said ring against said surface, said cylinder bores being connected with said chamber so that the fluid pressure in said chamber is communicated to said pistons for actuating the same, said ring being effective to open and close said ports successively as said valve member rotates, so that said cylinders are brought into communication with said chamber successively and similarly isolated from said chamber.

8. A fluid-pressure device according to claim 7 including an additional ring encircling the first-mentioned ring and spaced therefrom radially, said additional ring bearing at one end against said surface and seated in a second annular groove in said non-rotatable member, and spring means pressing said additional ring against said surface, said rings forming, conjointly with said members, a second chamber, the arrangement being such that each of said ports communicates alternately with the two chambers as said valve member rotates.

DONALD H. McGOGY.

REFERENCES CITED

The following references are of record in the file of this patent:

UNITED STATES PATENTS

| Number | Name | Date |
|---|---|---|
| 1,914,622 | Smith | June 20, 1933 |
| 2,211,402 | Benedek | Aug. 13, 1940 |
| 2,360,025 | Wahlmark | Oct. 10, 1944 |
| 2,397,314 | Grosser | Mar. 26, 1946 |

FOREIGN PATENTS

| Number | Country | Date |
|---|---|---|
| 137,638 | Great Britain | Feb. 13, 1920 |